(12) United States Patent
Grosso, Sr.

(10) Patent No.: US 6,570,133 B1
(45) Date of Patent: May 27, 2003

(54) PORTABLE FOOD WARMING SYSTEM

(76) Inventor: Gaetano T. Grosso, Sr., 47 Sproat St. Apt. 1, Middletown, NY (US) 10940

( * ) Notice: Subject to any disclaimer, the term of this patent is extended or adjusted under 35 U.S.C. 154(b) by 0 days.

(21) Appl. No.: 10/171,823

(22) Filed: Jun. 14, 2002

(51) Int. Cl.$^7$ .............................. A21B 1/52; A41J 56/24
(52) U.S. Cl. ...................................................... 219/387
(58) Field of Search ................................ 219/387, 386; 126/261, 266

(56) References Cited

U.S. PATENT DOCUMENTS

| | | | |
|---|---|---|---|
| 2,577,870 A | | 12/1951 | Aston |
| 2,704,319 A | * | 3/1955 | Lott ............................ 219/387 |
| 2,713,111 A | * | 7/1955 | McCreary .................... 219/387 |
| 2,976,390 A | * | 3/1961 | Stemp ......................... 219/387 |
| 3,602,691 A | * | 8/1971 | Frazier ........................ 219/387 |
| 3,808,401 A | | 4/1974 | Wright et al. |
| 4,037,081 A | * | 7/1977 | Aldridge et al. ............. 219/387 |
| 4,578,814 A | | 3/1986 | Skamser |
| 4,816,646 A | | 3/1989 | Solomon et al. |
| 4,904,848 A | * | 2/1990 | Colevas ....................... 219/387 |
| 4,933,534 A | | 6/1990 | Cunningham et al. |
| D315,249 S | | 3/1991 | Tilson |
| 5,274,215 A | | 12/1993 | Jackson |

* cited by examiner

*Primary Examiner*—Joseph Pelham

(57) ABSTRACT

A portable food warming system for keeping food warm while traveling in a vehicle having a power socket. The portable food warming system includes a container that has an opening extending into an interior of the container. A cover may be provided for selectively closing the opening in the container. A heating assembly is provided for selectively heating a bottom wall of the container. The heating assembly preferably includes a housing that has an aperture extending into a cavity of the housing. In one embodiment of the present invention, the bottom wall of the container selectively closes the aperture of the housing. A heating element is mounted in the cavity of the housing for heating the bottom wall of the container when the container is mounted on the housing.

20 Claims, 2 Drawing Sheets

PORTABLE FOOD WARMING SYSTEM

BACKGROUND OF THE INVENTION

1. Field of the Invention

The present invention relates to food containers and more particularly pertains to a new portable food warming system for keeping food warm while traveling in a vehicle having a power socket.

2. Description of the Prior Art

The use of food containers is known in the prior art. More specifically, food containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,816,646; U.S. Pat. No. 5,274,215; U.S. Pat. No. 3,808,401; U.S. Pat. No. 4,933,534; U.S. Pat. No. 4,578,814; U.S. Pat. No. 2,577,870; and U.S. Pat. No. Des. 315,249.

While these devices fulfill their respective, particular objectives and requirements, the aforementioned patents do not disclose a new portable food warming system. The inventive device includes a container that has an opening extending into an interior of the container. A cover may be provided for selectively closing the opening in the container. A heating assembly is provided for selectively heating a bottom wall of the container. The heating assembly preferably includes a housing that has an aperture extending into a cavity of the housing. In one embodiment of the present invention, the bottom wall of the container selectively closes the aperture of the housing. A heating element is mounted in the cavity of the housing for heating the bottom wall of the container when the container is mounted on the housing.

In these respects, the portable food warming system according to the present invention substantially departs from the conventional concepts and designs of the prior art, and in so doing provides an apparatus primarily developed for the purpose of keeping food warm while traveling in a vehicle having a power socket.

SUMMARY OF THE INVENTION

In view of the foregoing disadvantages inherent in the known types of food containers now present in the prior art, the present invention provides a new portable food warming system construction wherein the same can be utilized for keeping food warm while traveling in a vehicle having a power socket.

The general purpose of the present invention, which will be described subsequently in greater detail, is to provide a new portable food warming system apparatus and method which has many of the advantages of the food containers mentioned heretofore and many novel features that result in a new portable food warming system which is not anticipated, rendered obvious, suggested, or even implied by any of the prior art food containers, either alone or in any combination thereof.

To attain this, the present invention generally comprises a container that has an opening extending into an interior of the container. A cover may be provided for selectively closing the opening in the container. A heating assembly is provided for selectively heating a bottom wall of the container. The heating assembly preferably includes a housing that has an aperture extending into a cavity of the housing. In one embodiment of the present invention, the bottom wall of the container selectively closes the aperture of the housing. A heating element is mounted in the cavity of the housing for heating the bottom wall of the container when the container is mounted on the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable food warming system apparatus and method which has many of the advantages of the food containers mentioned heretofore and many novel features that result in a new portable food warming system which is not anticipated, rendered obvious, suggested, or even implied by any of the prior art food containers, either alone or in any combination thereof.

It is another object of the present invention to provide a new portable food warming system which may be easily and efficiently manufactured and marketed.

It is a further object of the present invention to provide a new portable food warming system which is of a durable and reliable construction.

An even further object of the present invention is to provide a new portable food warming system which is susceptible of a low cost of manufacture with regard to both materials and labor, and which accordingly is then susceptible of low prices of sale to the consuming public, thereby making such portable food warming system economically available to the buying public.

Still yet another object of the present invention is to provide a new portable food warming system which provides in the apparatuses and methods of the prior art some of the advantages thereof, while simultaneously overcoming some of the disadvantages normally associated therewith.

Still another object of the present invention is to provide a new portable food warming system for keeping food warm while traveling in a vehicle having a power socket.

Yet another object of the present invention is to provide a new portable food warming system which includes a container that has an opening extending into an interior of the container. A cover may be provided for selectively closing the opening in the container. A heating assembly is provided for selectively heating a bottom wall of the container. The heating assembly preferably includes a housing that has an aperture extending into a cavity of the housing. In one embodiment of the present invention, the bottom wall of the container selectively closes the aperture of the housing. A heating element is mounted in the cavity of the housing for heating the bottom wall of the container when the container is mounted on the housing.

Still yet another object of the present invention is to provide a new portable food warming system that can save a user money by allowing the user to avoid eating in restaurants while traveling by keeping food from home warm.

Even still another object of the present invention is to provide a new portable food warming system that allows restaurants that deliver food to keep the food warm until it reaches the customer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
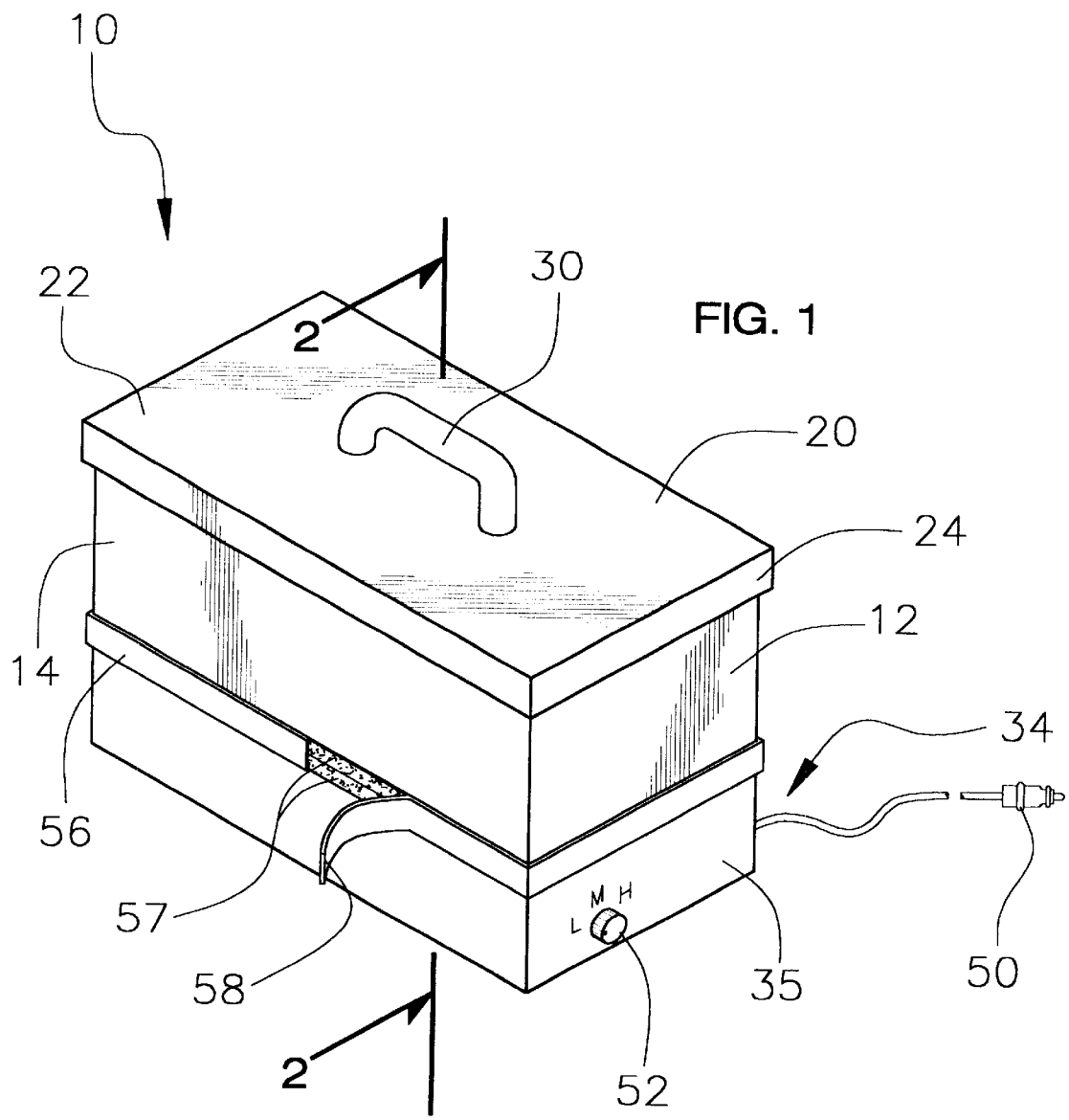
FIG. 1 is a schematic perspective view of a new portable food warming system according to the present invention.
Figure 2:
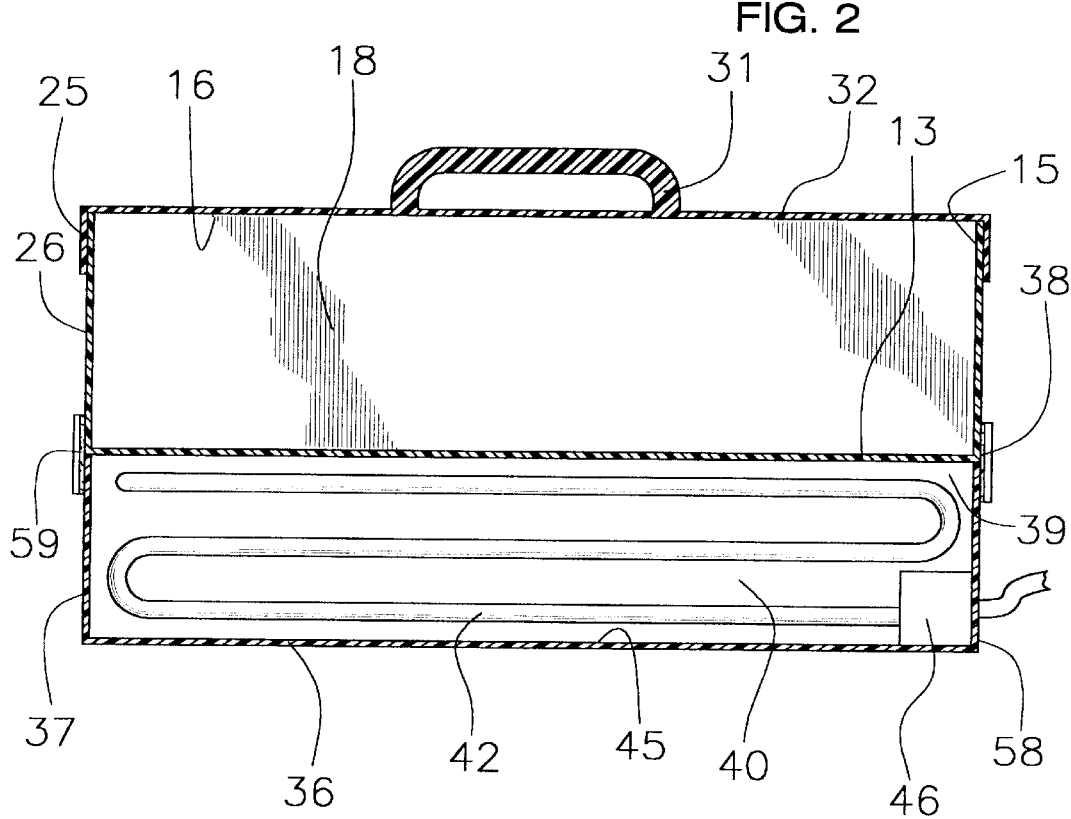
FIG. 2 is a schematic cross-sectional view of the present invention taken along line 2—2 of FIG. 1.

With reference now to the drawings, and in particular to FIGS. 1 through 2 thereof, a new portable food warming system embodying the principles and concepts of the present invention and generally designated by the reference numeral 10 will be described.

As best illustrated in FIGS. 1 through 2, the portable food warming system 10 generally comprises a container 12 for holding the food while is transported. The container 12 preferably includes a bottom wall 13 and a peripheral wall 14 extending from the bottom wall 13. An edge 15 of the peripheral wall 14 defines an opening 16 extending into an interior 18 of the container 12. The container 12 may comprise any material having generally insulating properties such as, for example, a plastic material or a glass material. The container 12 may have a length measuring approximately twenty-four inches and a width measuring approximately twenty-four inches, although various sized containers 12 may be employed A cover 20 may be provided for selectively closing the opening 16 in the container 12. The cover 20 may include a top wall 22 and a perimeter wall 24 extending from the top wall 22. The cover 20 is removably mounted on the container 12 such that an inner surface 25 of the perimeter wall 24 of the cover 20 selectively abuts an outer surface 26 of the peripheral wall 14 of the container 12. In one embodiment of the present invention, as particularly illustrated in FIG. 2, the cover 20 selectively closes the opening 16.

A handle 30 may be mounted on the cover 20 so that a user may place or remove the cover 20 from the container 12. The handle 30 may include a pair of ends 31 that are mounted on an upper surface 32 of the top wall 22 of the cover 20 such that the handle 30 has a generally arcuate shape.

As illustrated in FIG. 2, a heating assembly 34 is provided for selectively heating the bottom wall 13 of the container 12. The heating assembly 34 preferably includes a housing 35 that has a base wall 36 and a peripheral wall 37 extending from the base wall 36. An edge 38 of the peripheral wall 37 of the housing 35 defines an aperture 39 extending into a cavity 40 of the housing 35.

In one embodiment of the present invention, the bottom wall 13 of the container 12 is selectively abuttable against the edge 38 of the housing 35 such that the bottom wall 13 of the container 12 selectively closes the aperture 39 of the housing 35.

A heating element 42 is mounted in the cavity 40 of the housing 35 for heating the bottom wall 13 of the container 12 when the container 12 is mounted on the housing 35. The heating element 42 is positioned generally adjacent to a top surface 45 of the base wall 36. An end 46 of the heating element 42 is mounted on the peripheral wall 37 of the housing 35. The heating element 42 may have a generally coiled shape.

A plug 50 may be provided for selectively providing power to the heating element 42. The plug 50 is may be mounted on the peripheral wall 37 of the housing 35 and electrically connected to the heating element 42. The plug 50 may be designed for being removably insertable in the power socket in the vehicle. The plug 50 may also be designed for being removably insertable in an outlet of a wall surface.

A switch 52 may be provided for selectively controlling the amount of power supplied to the heating coil 42. The switch 52 may be mounted on the peripheral wall 37 of the housing 35 and electrically connected to the heating element 42. The switch 52 may be designed for controlling the amount of power flowing to the heating element 42 from the plug 50. In one embodiment of the present invention, a temperature of the heating element 42 is regulated.

A fastening member 56 may be provided for fastening the container 12 to the housing 35. The fastening member 56 may include a pair of first fastening portions 57 and a second fastening portion 58.

In one embodiment of the present invention, each of the first fastening portions 57 are mounted on the outer surface 26 of the peripheral wall 14 of the container 12 and mounted on an outer surface 58 of the peripheral wall 37 of the housing 35. Each of the first fastening portions 57 may extend about a perimeter of the container 12 and the housing 35. Each of the first fastening portions 57 may be positioned generally adjacent to a juncture 59 of the container 12 and the housing 35 when the container 12 is mounted on the housing 35.

In one embodiment of the present invention, the second fastening portion 58 is removably fastenable to each of the first fastening portions 57. The second fastening portion 58 may extend about the juncture 59 of the container 12 and the housing 35 securing the container 12 to the housing 35. The fastening member 56 may comprise a hook and loop fastener.

In use, warm food may be kept warm while being transported. Food stored in the interior 18 of the container 12 is kept warm by the heating element 42 in the housing 35.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable food warming system for keeping food warm while traveling in a vehicle having socket, said system comprising:
    a container having an opening extending into an interior of said container;
    a cover for selectively closing said opening in said container;
    a heating assembly for selectively heating a bottom wall of said container, said heating assembly including:
        a housing having an aperture extending into a cavity of said housing;
        wherein said bottom wall of said container selectively closes said aperture of said housing;
        a heating element being mounted in said cavity of said housing for heating said bottom wall of said container when said container is mounted on said housing.

2. The portable food warming system of claim 1, wherein said container has a bottom wall and a peripheral wall extending from said bottom wall, an edge of said peripheral wall defining said opening extending into said interior of said container.

3. The portable food warming system of claim 2, wherein said cover has a top wall and a perimeter wall extending from said top wall, said cover being mounted on said container such that an inner surface of said perimeter wall of said cover selectively abuts an outer surface of said peripheral wall of said container.

4. The portable food warming system of claim 3, additionally including a handle mounted on said cover.

5. The portable food warming system of claim 4, wherein said handle has a pair of ends, each of said ends being mounted on an upper surface of said top wall of said cover.

6. The portable food warming system of claim 1, wherein said housing of said heating assembly has a base wall and a peripheral wall extending from said base wall, an edge of said peripheral wall of said housing defining said aperture extending into said cavity of said housing.

7. The portable food warming system of claim 6, wherein said bottom wall of said container is selectively abuttable against said edge of said housing.

8. The portable food warming system of claim 1, wherein an end of said heating element being mounted on said peripheral wall of said housing.

9. The portable food warming system of claim 8, wherein said heating element has a generally coiled shape.

10. The portable food warming system of claim 9, additionally a plug for selectively providing power to said heating element, said plug being mounted on said peripheral wall of said housing and electrically connected to said heating element.

11. The portable food warming system of claim 10, wherein said plug is adapted for being removably insertable in the power socket in the vehicle.

12. The portable food warming system of claim 11, additionally including a switch for selectively providing power to said heating coil, said switch being mounted on said peripheral wall of said housing and electrically connected to said heating element.

13. The portable food warming system of claim 12, wherein said switch is adapted for control the amount of power flowing to said heating element from said plug.

14. The portable food warming system of claim 7, additionally including a fastening member for fastening said container to said housing, said fastening member extending between and coupled to said container and said housing.

15. The portable food warming system of claim 14, wherein said fastening member includes a pair of first fastening portions and a second fastening portion, wherein each of said first fastening portions is mounted on said peripheral wall of said container and mounted on said peripheral wall of said housing.

16. The portable food warming system of claim 15, wherein each of said first fastening portions extends about a perimeter of said container and said housing, each of said first fastening portions being positioned generally adjacent to a juncture of said container and said housing when said container is mounted on said housing.

17. The portable food warming system of claim 16, wherein said second fastening portion is removably fastenable to each of said first fastening portions.

18. The portable food warming system of claim 17, wherein said second fastening portion extends about the juncture of said container and said housing, wherein said container is securely fastened to said housing.

19. The portable food warming system of claim 18, wherein said fastening member comprises a hook and loop fastener.

20. A portable food warming system for keeping food warm while traveling in a vehicle having socket, said system comprising:
    a container for holding the food while being transported, said container having a bottom wall and a peripheral wall extending from said bottom wall, an edge of said peripheral wall defining an opening extending into an interior of said container;
    a cover for selectively closing said opening in said container, said cover having a top wall and a perimeter wall extending from said top wall, said cover being on said container such that an inner surface of said perimeter wall of said cover selectively abuts an outer surface of said peripheral wall of said container, wherein said cover selectively closes said opening;
    a handle mounted on said cover, said handle having a pair of ends, each of said ends being mounted on an upper surface of said top wall of said cover such that said handle has a generally arcuate shape;

a heating assembly for selectively heating said bottom wall of said container, said heating assembly including:

a housing having a base wall and a peripheral wall extending from said base wall, an edge of said peripheral wall of said housing defining an aperture extending into a cavity of said housing;

wherein said bottom wall of said container is selectively abuttable against said edge of said housing such that said bottom wall of said container selectively closes said aperture of said housing;

a heating element being mounted in said cavity of said housing for heating said bottom wall of said container when said container is mounted on said housing, said heating element being positioned generally adjacent to a top surface of said base wall, an end of said heating element being mounted on said peripheral wall of said housing, said heating element having a generally coiled shape;

a plug for selectively providing power to said heating element, said plug being mounted on said peripheral wall of said housing and electrically connected to said heating element, said plug being adapted for being removably insertable in the power socket in the vehicle;

a switch for selectively providing power to said heating coil, said switch being mounted on said peripheral wall of said housing and electrically connected to said heating element, said switch being adapted for control the amount of power flowing to said heating element from said plug, wherein a temperature of said heating elements is regulated;

a fastening member for fastening said container to said housing, said fastening member including a pair of first fastening portions and a second fastening portion;

wherein each of said first fastening portions is mounted on said outer surface of said peripheral wall of said container and mounted on said outer surface of said peripheral wall of said housing, each of said first fastening portions extending about a perimeter of said container and said housing, each of said first fastening portions being positioned generally adjacent to a juncture of said container and said housing when said container is mounted on said housing; and wherein said second fastening portion is removably fastenable to each of said first fastening portions, said second fastening portion extending about the juncture of said container and said housing, wherein said container is securely fastened to said housing, said fastening member comprising a hook and loop fastener.

* * * * *